US012675079B2

(12) United States Patent
Crowley et al.

(10) Patent No.: US 12,675,079 B2
(45) Date of Patent: Jul. 7, 2026

(54) ELECTRONIC DEVICE HAVING UNDERWATER NOTIFICATION FEATURES

(71) Applicant: Apple Inc., Cupertino, CA (US)

(72) Inventors: Patrick J. Crowley, Santa Clara, CA (US); Collin J. Richardson, Livermore, CA (US); Jason A. Granger, San Jose, CA (US)

(73) Assignee: APPLE INC., Cupertino, CA (US)

( * ) Notice: Subject to any disclaimer, the term of this patent is extended or adjusted under 35 U.S.C. 154(b) by 346 days.

(21) Appl. No.: 18/306,899

(22) Filed: Apr. 25, 2023

(65) Prior Publication Data

US 2024/0361730 A1 Oct. 31, 2024

(51) Int. Cl.
*G04G 21/02* (2010.01)

(52) U.S. Cl.
CPC .................................... *G04G 21/02* (2013.01)

(58) Field of Classification Search
CPC ........ G04G 21/02; G04G 21/00; G04G 21/16; G04C 21/34
See application file for complete search history.

(56) References Cited

U.S. PATENT DOCUMENTS 3,937,004 A * 2/1976 Natori .................... G04G 9/126 455/344
4,733,383 A * 3/1988 Waterbury ................ G01T 7/00 368/10
5,311,487 A * 5/1994 Mininni ................... G04G 9/08 368/230
5,559,761 A * 9/1996 Frenkel .................. G04G 21/06 368/230
8,059,494 B2 * 11/2011 Veuthey ................. G04G 13/00 368/243
9,514,621 B2 * 12/2016 Herron ..................... G04G 9/00
10,401,167 B2 * 9/2019 Huo ........................... G01L 1/00
10,503,257 B2 * 12/2019 Masihy ............... H04M 1/0235
11,231,782 B2 * 1/2022 Baek ........................ G06F 1/163
2005/0135198 A1 * 6/2005 Wellen ................... G04G 21/00 368/230
2012/0307603 A1 * 12/2012 Bongio ................ G04G 13/021 368/243
2017/0185043 A1 * 6/2017 Yuen ...................... G04B 19/30

OTHER PUBLICATIONS

Huawei P40 Pro Specifications, available at https://consumer.huawei.com/en/phones/p40-pro/specs/, at least as early as Apr. 25, 2023.

* cited by examiner

*Primary Examiner* — Sean Kayes
(74) *Attorney, Agent, or Firm* — Dorsey & Whitney LLP

(57) ABSTRACT

A wearable electronic device can include a housing defining an internal volume, a sensor configured to detect an environment of the wearable electronic device. A display can be movably connected to the housing, and an actuator disposed in the internal volume and connected to the display. The actuator can move the display based on a detected change in the environment.

10 Claims, 9 Drawing Sheets

ELECTRONIC DEVICE HAVING UNDERWATER NOTIFICATION FEATURES

FIELD

The described embodiments relate generally to output features of an electronic device. More particularly, the present embodiments relate to an electronic device having a display that moves to generate sound waves underwater.

BACKGROUND

Electronic devices are increasingly designed with portability in mind. Device portability allows for the use of these devices in a wide variety of situations and environments. For example, wearable electronic devices are increasingly being used in active and harsh environments, such as underwater. However, the device may not have full functionality in a submerged environment. Improvements and advances to portable electronic devices are desired to provide additional functionality in a variety of situations and environments.

SUMMARY

According to some aspects of the present disclosure, a wearable electronic device can include a housing defining an internal volume, a sensor configured to detect an environment of the wearable electronic device; a display movably connected to the housing, and an actuator disposed in the internal volume and connected to the display. The actuator can move the display based on a detected change in the environment.

In some examples, the wearable electronic device can be a smartwatch. The display can include a sapphire cover glass. The actuator can include a magnetic component and a coil, the coil fixed to the display and movable relative to the magnetic component. A deformable seal can be disposed along a perimeter of the display and connecting the display to the housing.

In some examples, a seal can be disposed between a periphery of the display and the housing, and the seal can include an elastic material. The actuator can include a metallic coil secured to an underside of the display. The actuator can include a magnetic component fixedly secured to the housing. The display can define an exterior surface of the wearable electronic device, and the actuator can produce uniform movement of the exterior surface. The actuator can include at least one of a voice coil actuator, a moving magnetic component actuator, an eccentric rotating mass, or a linear resonant actuator. The movement of the display underwater can generate sound waves between 50 Hz and 15,000 Hz. The wearable electronic device can include a sensor to detect the sound waves. The actuator can generate a variable force dependent on a detected pressure.

According to some aspects, an electronic device can include an enclosure defining an aperture, a rigid exterior occluding the aperture, a seal disposed between the rigid exterior and the enclosure, an atmospheric mode in which the electronic device operates under a first set of parameters, an underwater mode in which the electronic device operates under a second set of parameters, and a motor disposed in the enclosure configured to vibrate the rigid exterior relative to the housing in response to the electronic device being in the underwater mode, wherein a force of the motor is based on a detected pressure.

In some examples, the rigid exterior can include a display that produces acoustic waves when vibrated by the motor. The rigid exterior can include a transparent ceramic. The rigid exterior can have a young's modulus of between about 350 GPa to about 530 GPa. The motor can include a coil to inductively charge the electronic device. The rigid exterior can produce sound waves between about 50 Hz to about 15 kHz.

According to some aspects, a transducer for converting an electrical signal into a sound output can include a diaphragm to oscillate to produce the sound output, and a coil to oscillate the diaphragm in response to a detected pressure exceeding a predetermined threshold. The diaphragm can include a display screen.

In some examples, the transducer is at least partially disposed within a housing of a wearable electronic device. The coil can be a first coil that interacts with a first fixed magnet, the transducer can further include a second coil that interacts with a second fixed magnet. The coil can move the display to produce a haptic feedback. The diaphragm can define an exterior surface of an electronic device that is substantially rigid and substantially flat.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
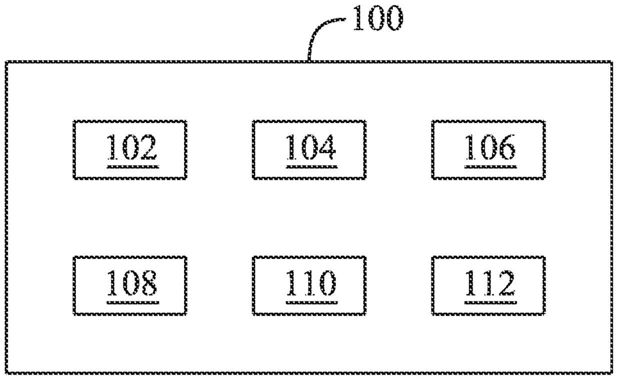
FIG. 1 shows a schematic block diagram of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Electronic devices are increasingly mobile. Device portability allows for the use of these devices in a wide variety of situations and environments. "Environments" can include the surroundings, conditions, and physical parameters in which an object operates. For example, wearable electronic devices are increasingly being used underwater.

Operating an electronic device, such as a smartwatch while underwater creates multiple challenges. For example, standard outputs or notification features of a smartwatch may not be effective underwater. Traditional acoustic notifications may not be possible because a typical device speaker is not capable of generating audible sound waves underwater. Current smartwatch speaker diaphragms are too soft to be driven while the device is under high pressure.

Further, while haptic notification components may still be operable underwater, these may be ineffective, for example if the user is wearing a thick wetsuit or distracted by other factors.

Moreover, there may be instances in which a group of individuals are underwater together (e.g., group of divers). There may be certain alerts intended for the multiple individuals, and which may be critical to their safety. Using traditional notification means, the nearby divers are unlikely to perceive haptic or visual outputs, however, audible outputs can in theory reach all intended individuals. Thus, there exists a need for an electronic device having a notification feature that can be used and easily perceived by a user underwater.

The present disclosure relates to an electronic device that has the ability to produce acoustic waves underwater. The electronic device can be a wearable device such as a smartwatch. As described herein, the electronic device can function as a transducer by moving its display back and forth. The transducer can generate sound waves out of electrical energy. Energy is transformed from the form of electrical current into motion of the display and eventually into acoustic waves or sound output. Thus, from an electric current to wave-shaped changes in pressure (sound). The sound waves or sound outputs produced by the moving display can be audible to a human underwater. For example, the sound waves can have a frequency of about 50 Hz to about 15,000 Hz. An actuator disposed in the internal volume and connected to the display can move the display based on a detected change in the environment. The change in the environment can include at least one of a pressure change, a moisture change, a temperature change, or a location change.

The present disclosure contemplates a producing sound waves underwater by rapidly moving a display face or screen back and forth in a vibrating, resonating, or oscillating fashion. The device can include an actuator or motor to move the display, and a tuned silicone seal positioned along a perimeter or periphery of the display that allows for high frequency resonance of the display assembly, which in turn generates sound waves that can be audible underwater. The seal can be tuned so that the display does not bottom out completely, allowing the voice coil to drive the display at high frequencies that can be easily perceived by the user or others nearby. The display can be movably connected to the housing (i.e., the display is attached or coupled to the housing, but its relative position to the housing is not fixed. In some examples, the display is movably connected to the housing at least in part by the seal.

The actuator or motor responsible for moving the display can include a magnetic component and a coil, such as a metallic coil or a voice coil, fixed to the display. The coil can be movable relative to the magnetic component, which can be fixed relative to the housing. Thus, the display can move using electromagnetic interactions between a coil and magnetic component. In some examples, the actuator includes a voice coil actuator, moving magnetic component actuator, an eccentric rotating mass, or a linear resonant actuator. The actuator can be referred to as a motor or a driver. In some examples, the coil used to move the display can also be used for wireless power transfer, such as magnetic inductive charging to inductively charge the device.

In some examples, the actuator activated in response to a detected pressure exceeding a predetermined threshold, which may indicate that the device is underwater. In some examples, the actuator generates a variable force dependent on an underwater pressure. For example, in shallow waters where the water pressure is less than in deep waters, the force required to move the display may be less than the force required to similarly move the display in deep water at a high pressure.

In other words, the display acts as a speaker diaphragm. The seal and the motor can be tuned such that, under the pressure of water. The high frequencies produced by the vibrating display can be easily perceived by the user and any divers nearby. This audio alert can be used for ascent speed warnings, safety stop notification, dive time notifications, air supply notifications, battery notifications, panic/siren (underwater SOS to nearby divers), etc.

The display can include a cover, such as a transparent ceramic cover glass, and a number of display panel capable of producing visual images visible on an exterior of the electronic device. As used herein "display" can refer to certain portions of or an entirety of a display assembly. The display assembly can include multiple layers, including protective layers, glass layers, filters, polarizers, reflectors, liquid crystal displays, light-emitting diodes, backlight layers, light guides, touch-sensitive layers, force-sensitive layers, as so on. In some examples, the entire display assembly moves. The cover glass, the display panel, including any touch detection layer, force sensitive layers, and display layers can all move in response to the driver or motor. In some examples, only certain portions of the display assembly move, while others remain stationary. For example, the cover glass can be moved while the other layers or components of the display remain stationary.

The waves generated by the vibrating the display can be used for a variety of notifications including warnings, time alerts, depth, position, proximity, oxygen levels, biometric information, temperature, pressure, equalizing reminders, alerts that a diver is descending or rising too fast or too slow, siren distress call, battery status, safety alters, air supply, etc. In some examples, the waves generated by the display can be used as sonar to navigate, measure distances, communicate, or detect objects.

In some examples, a coil can be used to drive the display and also used for near-field communication or wireless power transfer, such as magnetic induction charging. In some examples, the coil is Qi compatible. Thus, the electronic device can be wirelessly charged by placing the device face down on a wireless charging pad (i.e., with the display on the charging pad). In some examples, the magnetic components can be used to drive the display and can also be used to aid in magnetically coupling the device to a magnetic attachment. For example, the magnetic component can aid in correctly coupling the device to a wireless charger.

In some examples, the wearable electronic device includes a housing or enclosure. The housing can include a back wall and multiple sidewalls to define an internal volume. Various electronic components can be disposed within the internal volume of the housing.

The internal volume can further be defined by a display, display screen, or display assembly. The display can be disposed within an aperture defined by the housing. In other words, the display can occlude the opening or aperture defined by the housing. Thus, the display can form a rigid exterior surface of the electronic device. In other words, a rigid exterior of the electronic device can be moved back and forth to produce the sound waves underwater. Exposure of the rigid section to the exterior of the device allows it to directly interact with the water. In some examples, the rigid exterior surface defined by the display can have a young's modulus of between about 350 GPa to about 530 GPa. Thus, the device can be substantially rigid. As used herein "rigid"

or "substantially rigid" refers to an ability to not deform when oscillating in higher pressure environments, such as when submerged in water. Thus, the display does not significantly bend or deform in response to oscillating when submerged. As described herein, the display functions as a diaphragm of a speaker. In some examples, the exterior of the display, such as the cover glass can be substantially flat (i.e., the exterior surface of the cover glass can smooth and even and primary reside in a single plane).

The electronic device can include a seal disposed along a perimeter, periphery, or edge of the display. The seal can be disposed between the display and the housing, for instance between an underside perimeter of the display and a bezel or perimeter of the housing. The seal can include an elastic material, such as an elastomer, such as silicone. The seal can be a deformable seal, capable of deforming, elastically or inelastically in response to movements of the display. In some examples, the electronic device can include a sensor capable of detecting reflections of the sound waves off of an object. Thus, the electronic device can operate as a sonar transducer. In some examples, the device can include an atmospheric mode in which the electronic device operates under a first set of parameters. The atmospheric mode can be used for operating the device in normal atmospheric environments (e.g., in air at ~1 atm). The device can also include an underwater mode in which the electronic device operates under a second set of parameters, different than the first set of parameters used in the atmospheric mode. The underwater mode can be used for operating the device when submerged in water or other liquid, or when the device is in a high pressure environment (e.g., greater than 1 atm). As described herein, in the underwater mode, the device can implement alternative notification features in order to effectively alert the user or others to notifications. These and other embodiments are discussed below with reference to FIGS. 1-10. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a schematic block diagram of an electronic device 100. Electronic device 100 can correspond to any form of electronic device including a wearable device, a portable media player, a media storage device, a portable digital assistant ("PDA"), a tablet computer, a computer, a mobile communication device, a GPS unit, a remote control device, a smartwatch, a smart phone, or other electronic device. The electronic device 100 can be referred to as an electronic device, a consumer device, a portable device, a wearable device, or any other suitable identifier.

In some examples, the electronic device 100 includes a display 102, a housing 104, a processor 106, one or more sensors 108, a battery 110, and a motor 112. The electronic device 100 includes a housing or enclosure 104. The housing or enclosure 104 can be connected to a front cover or display 102. A number of input elements, such as a rotatable crown and/or a buttons can be attached to and can protrude from the housing 104.

The housing 104 can substantially define at least a portion of an exterior surface of the device 100. The display 102 can include glass, plastic, or any other substantially transparent material, component, or assembly. The display 102 can include a cover, a camera, a touch sensitive surface, such as a touchscreen, or other component of the device 100. The display 102 can define a front exterior surface of the device 100. The housing can include sidewalls and a back cover opposite the display 102. The back cover can include ceramic, plastic, metal, or combinations thereof. Together, the housing 104 and the display 102 can substantially define an interior volume and an exterior surface of the device 100.

The device 100 can also include internal components, such as one or more sensors 108, a battery 110, and a system in package (SiP), including one or more integrated circuits 106 such as processors, sensors, and memory. The SiP can also include a package. All or a portion of one or more internal components can be contained within the housing 104.

The internal components, such as one or more of components can be disposed within an internal volume defined at least partially by the housing 104, and can be affixed to the housing 104 via internal surfaces, attachment features, threaded connectors, studs, posts, or other features that are formed into, defined by, or otherwise part of the housing 104 and/or the display 102. As described in greater detail below, the electronic device 100 can include an actuator or motor 112 configured to move the display 102 relative to the housing to generate sound or pressure waves. The motor can be disposed within the housing 104.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2:
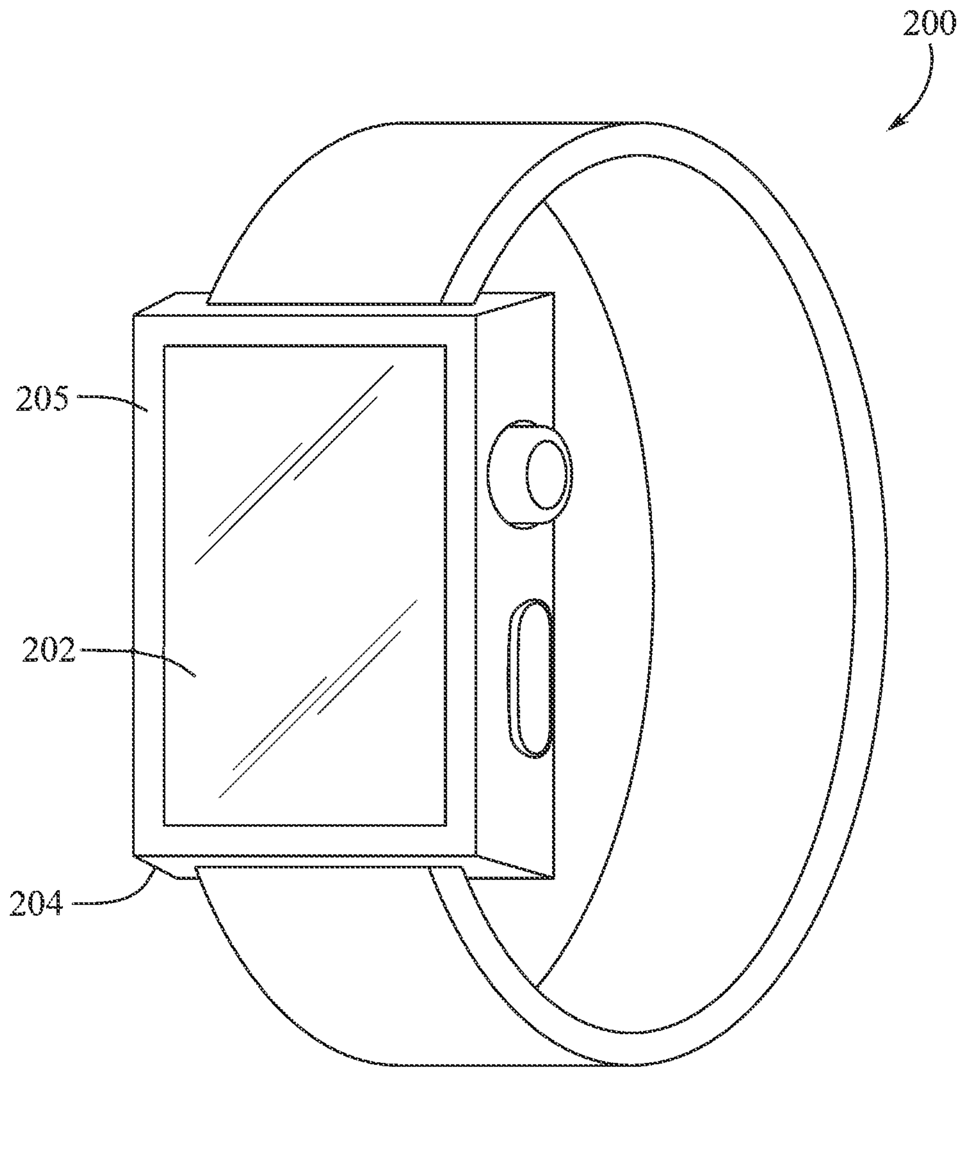
FIG. 2 shows a perspective view of a wearable device.

FIG. 2 shows a perspective view of a wearable device 200, such as a smartwatch. The wearable device 200 can be substantially similar to, including some or all of the features of, the electronic devices described herein, such as electronic device 100.

The wearable device 200 of FIG. 2 is merely one representative example of a device that can be used in conjunction with the systems and methods disclosed herein. In some examples, the wearable device 200 can include a housing 204 that can carry operational components, for example, in an internal volume at least partially defined by the housing 204. The housing 204 can include a border or bezel 205 that at least partially surrounds a display 202. The display 202 can be at least partially positioned in the internal volume of the housing 204 and can partially define the internal volume. In some examples, the housing 204 defines an aperture and the display 202 occludes the aperture. In some examples, there is no bezel 205 and the display 202 instead extends completely to the edge of sidewalls of the housing 204. The bezel 205 can be a separate and distinct piece from the housing 204 or it can be a unitary piece with the housing 204.

The wearable device 200 can also include a strap 207, or other retaining component that can secure the device 200 to a body of a user, as desired. Further details of the electronic device are provided below with reference to FIG. 3.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
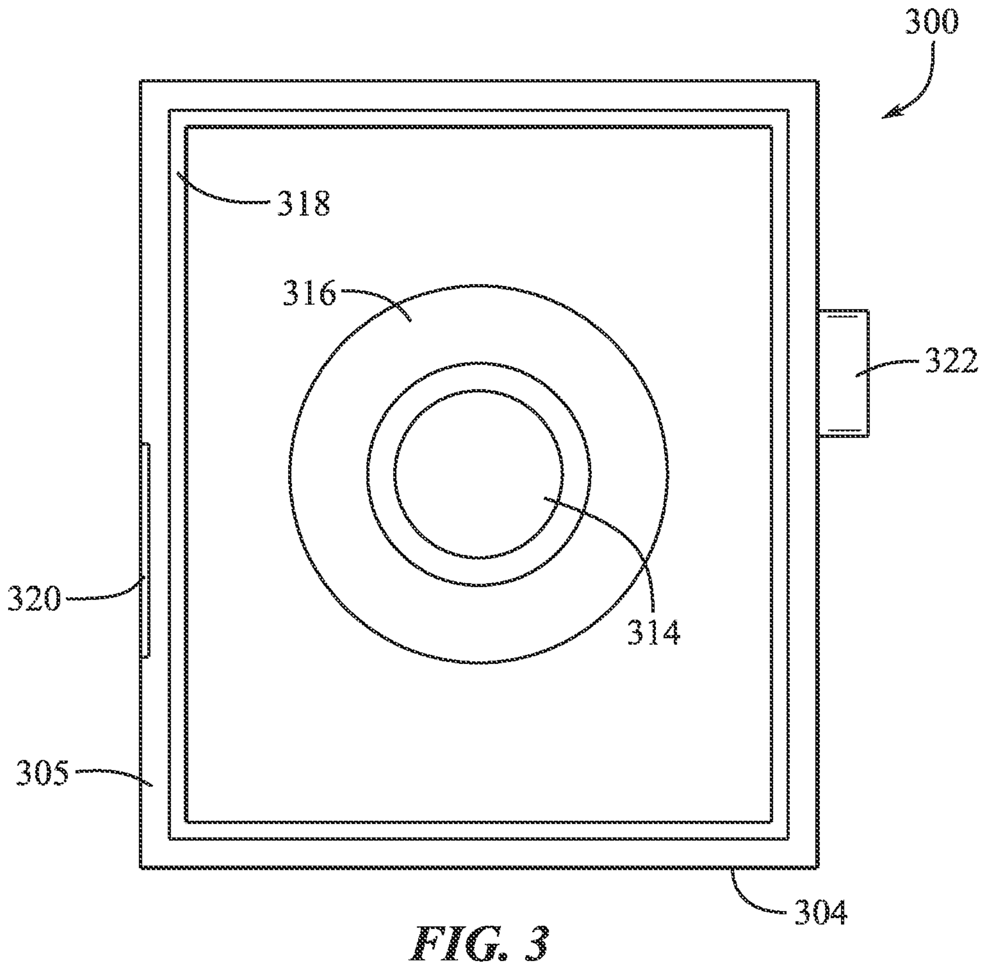
FIG. 3 shows front view of an electronic device.

FIG. 3 shows front view of an electronic device 300. The electronic device 300 can be substantially similar to, including some or all of the features of, the electronic devices described herein, such as electronic devices 100 and 200. In some examples, the electronic device 300 can include a magnetic component 314 and a coil 316 positioned within the internal volume of the housing 304, underneath or behind the display (removed here for simplicity). The magnetic component 314 together with the coil 316 can be referred to as a motor, driver, actuator, or any other suitable term conveying that the magnetic component 314 and the coil 316 can interact to cause the display to move. The electronic device 300 can include a seal 318 positioned between the display and the housing 304 and providing an elastic and waterproof barrier between the outside environment and the internal volume of the electronic device 300. The seal 318 can be disposed along a perimeter of the housing 304. In some examples, the seal 318 is positioned on or adjacent to a bezel 305. The seal 318 can include a tuned silicone that allows for high frequency resonance of the display. In some examples, the thickness and/or shape of the seal 318 can be specifically tailored to operate underwater at optimal depths. In some examples, the seal 318 can include clastic material that rebounds. The housing 304 could be a unitary component with the seal 318 or the housing 304 and the seal 318 can be separate components. Further details regarding the seal 318 are provided below.

The coil 316 can be any conductive material capable of carrying electrical current to create an electromagnetic field or being influenced by an electromagnetic field. The coil 316 can be attached to the display. In this manner, the display can act as a diaphragm as used in a traditional speaker. A controller or processor can, based on predetermined operating instructions, cause electrical pulses to pass through the coil 316. In some examples, the controller can cause actuate the driver (e.g., send pulses through the coil 316) in response to user input provided through input members 320, 322 or through the touch sensitive display. As pulses of electricity pass through the coil 316, the direction of a generated magnetic field can rapidly change, resulting in alternating attraction and repulsion forces to the magnetic component 314, causing movement, such as vibrations, oscillations, resonating, back and forth. The coil 316 can be secured to the display such that movement of the coil 316 can be transferred to the display, generating sound waves in the surrounding environment.

The magnetic component 314 can be any suitable material capable of having, generating, or capable of being influenced by a magnetic/electromagnetic field. In some examples, the magnetic component 314 is fixed or mounted relative to the housing 304. Thus, the magnetic component 314 can be fixedly secured to the housing 304 such that the magnetic component 314 is stationary relative to the housing 304. In some examples, the coil 316 is fixed relative to the housing 304 and the magnetic component 314 is attached to the display. The magnetic component 314 and coil 316 can be positioned along a central axis of the display. The position of the coil 316 and magnetic component 314 relative to the display can be determined to produce uniform motion of the display. For example, the display can define an exterior surface or wall of the device, and the actuator (magnetic component 314 and coil 316 produces uniform movement of the exterior surface by uniformly applying force on the display. The uniform movement can cause the entire display, or at least the entire exterior portion of the display to move in unison. As shown in FIG. 3, the coil 316 can surround the magnetic component 314. However, other physical arrangements are possible. For example, the magnetic component 314 can at least partially surround the coil 316. In some examples, the magnetic component 314 can include a gap or groove within which the coil 316 can be disposed, such that the magnetic component 314 surrounds or sandwiches the coil 316.

In some examples, the magnetic component 314 includes one or more magnets that can be individual, distinct, or separate from one another. The magnets can be in contact with one another or can be physically separated from one another, such that a gap or separation exists between one or more of the magnets. In some examples, the magnets can have varying shapes and sizes. As discussed in greater detail with reference to FIG. 4, the electronic device can include multiple sets of magnets and coils arranged to symmetrically drive the display face.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
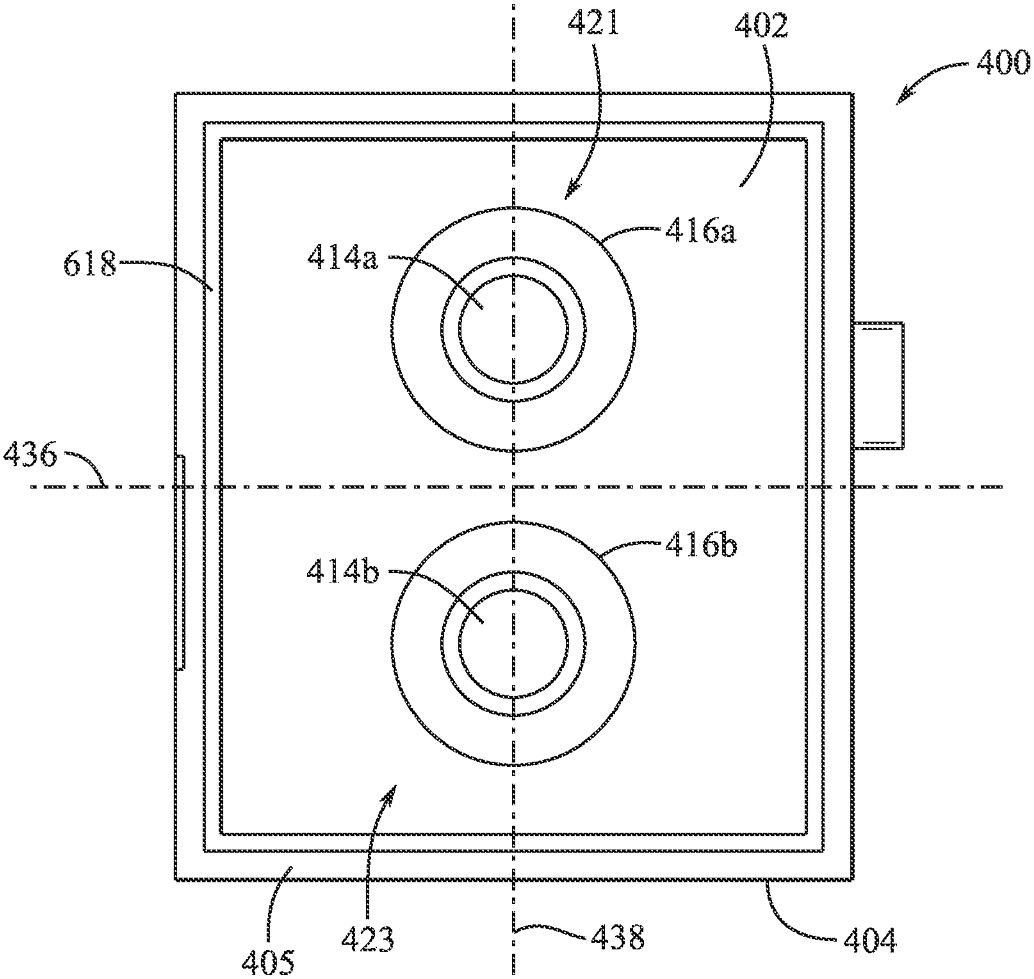
FIG. 4 shows a front view of an electronic device.

FIG. 4 shows a front view of an electronic device 400 having multiple drivers 421, 423. The electronic device 400 can be substantially similar to, including some or all of the features of, the electronic devices described herein, such as electronic devices 100, 200, and 300.

In some examples, the electronic device 400 can include multiple drivers 421, 423 arranged to cooperatively move the display 402 back and forth (i.e., depressing the display 402 toward a back cover and extending the display away from the back cover of the device 400. In some examples, the first driver 421 can include a first coil 416*a* and a first magnet 414*a*. The second driver 423 can include a second coil 416*b* and a second magnet 414*b*. The first driver 421 and the second driver 423 can be in sync to uniformly move the display 402.

The first driver 421 and the second driver 423 can be symmetrically aligned relative to the housing 404 and/or display 402 to ensure uniform forces are applied to the display 402. For example, the electronic device 400 can include a vertical axis 438 that bisects a center of the electronic device 400 from top to bottom (as oriented in FIG. 4). The respective centers of the first driver 421 and the second driver 423 can be positioned on the vertical axis 438 to ensure symmetrical forces are applied on the display 402. Likewise, the first driver 421 and the second driver 423 can be located equidistant from a horizontal axis 436 that bisect the electronic device 300 from side to side (as oriented in FIG. 4).

In some examples, an electronic device can include more than two drivers. For example, an electronic device can include four drivers that are arranged in a square pattern relative to each other. In some examples, the drivers can be the same or different sizes and capable of generating the same or different forces. In some examples, the drivers can be sized and positioned to accommodate for the internal components of the electronic device.

The number and size of the drivers can be based on the power needs of the device and the operating depths. In some examples, the device can include a low strength driver for use is low pressure environments, such as in shallow water, and a high strength driver for use in high pressure environments, such as in deep water. The magnetic component can be surrounded by a number of coils which are selectively activated based on the power needs.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
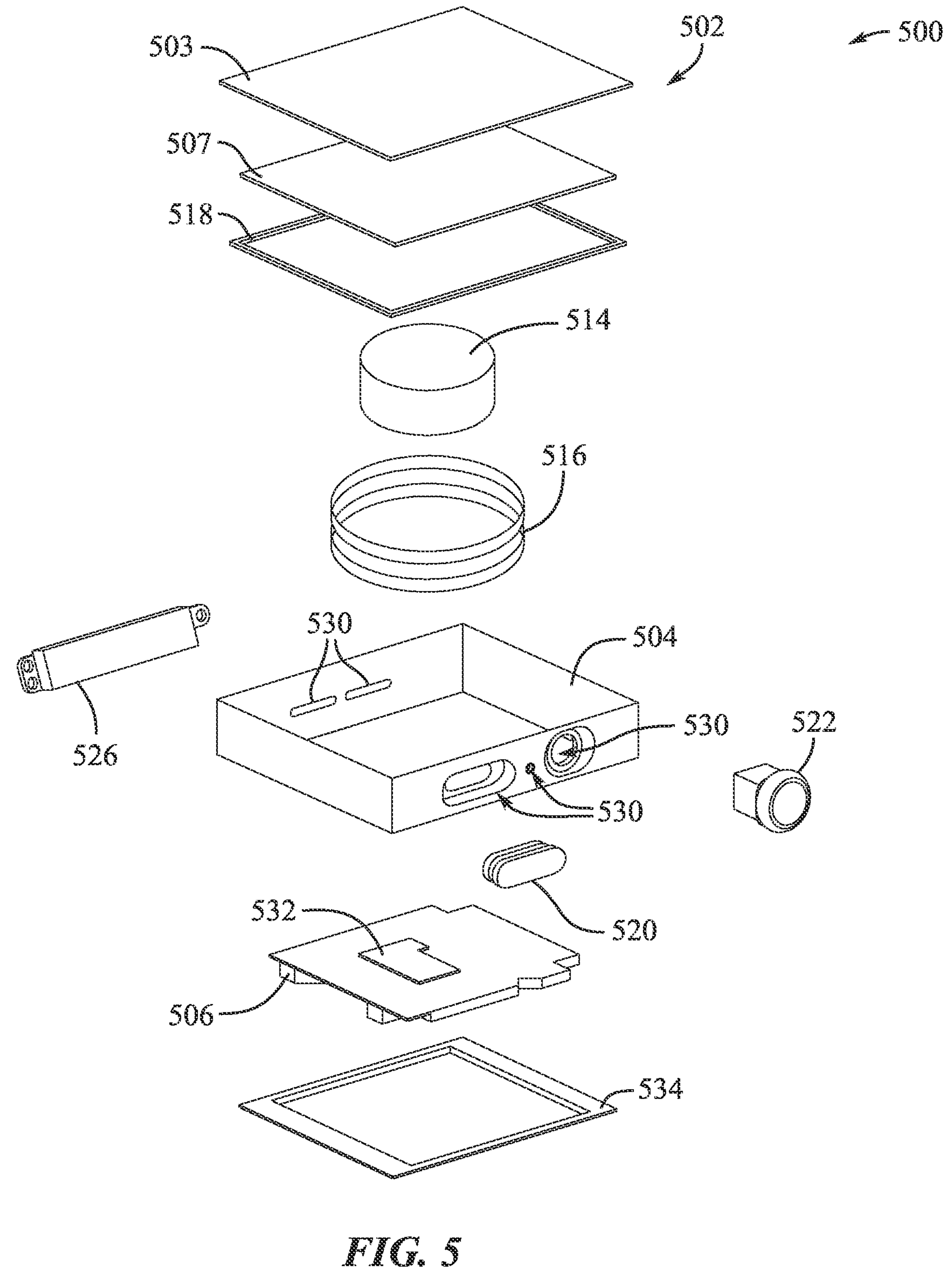
FIG. 5 shows an exploded perspective view of an electronic device.

FIG. 5 shows an exploded perspective view of an electronic device 500. The electronic device 500 can be substantially similar to, including some or all of the features of, the electronic devices described herein, such as electronic devices 100, 200, 300, and 400. The electronic device 500 can include a housing 504, a display assembly 502, and a back cover 534. Together, the housing 504, display assembly 502, and back cover 534 can define an exterior surface and an internal volume of the electronic device 500.

The housing 504 can be a substantially continuous or unitary component, and can define one or more openings 530 to receive components of the electronic device 500 and/or to provide access to an internal portion of the electronic device 500. In some examples, the electronic device 500 can include input components such as one or more buttons 520 and/or a crown 522 that can be disposed in one of the openings 530. A microphone (not shown) can be disposed in the internal volume in communication with the external or ambient environment through an opening 530.

The display assembly 502, also referred to herein as simply the "display" can be received by, and can be attached to, the housing 504. The display assembly 502 can include a cover 503 including a transparent material, such as plastic, glass, and/or ceramic. In some examples, the cover 503 includes a sapphire cover glass. It will be noted that a variety of suitable cover glass materials exist. Ideally, the cover 503 material will be a stiff material with a low surface deflection in high pressure environments. In some examples, the thickness of the cover 503 can be adjusted based on needs. For example, if the device is anticipated to be in deeper water, a thicker cover 503 can be used.

The display assembly 502 can also include a display panel 507 that can include multiple layers and components, each of which can perform one or more desired functions. For example, the display panel 507 can include a layer that can include a touch detection layer or component, a force sensitive layer or component, and one or more display layers or components that can include one or more pixels and/or light emitting portions to display visual content and/or information to a user. In some examples, the display layer or component can include a liquid crystal display (LCD), a light emitting diode (LED) display, an organic light emitting diode (OLED) display, and/or any other form of display. The display layer can also include one or more electrical connectors to provide signals and/or power to the display layer from other components of the electronic device 500.

In some examples, the electronic device 500 can include a gasket or seal 518 that can be disposed between the display assembly 502 and the housing 504 to substantially define a barrier to the ingress of liquids or moisture into the internal volume from the external environment at the location of the seal 518. As described herein, the seal 518 can include polymer, metal, and/or ceramic materials. The material, size, shape, and physical properties of the seal 518 can be specifically selected to achieve desired motion of the display assembly 502 as it moves in response to the coil 516 and magnetic component 514 interaction.

The electronic device 500 can also include a similar seal (not shown) that can be disposed between the housing 504 and the back cover 534 to substantially define a barrier to the ingress of liquids or moisture into the internal volume from the external environment at the location of the seal. As described herein, the seal can include polymer, metal, and/or ceramic materials. The seal can be substantially similar to, and can include, some or all of the features of the seal 518.

The electronic device 500 can also include internal components, such as a haptic engine, an electrical power supply (e.g., a battery), a speaker module 526, and a logic board 506, also referred to as a main logic board 506 that can include a system in package (SiP) 532 disposed thereon, including one or more integrated circuits, such as processors, sensors, and memory. The SiP 532 can also include a package.

In some examples, internal components can be disposed below the main logic board 506 and can be disposed at least partially in a portion of the internal volume defined by the back cover 534. In some examples, the electronic device 500 can include one or more wireless antennas (not shown) that can be in electrical communication with one or more other components of the electronic device 500. In some examples, the antenna(s) can receive and/or transmit wireless signals at one or more frequencies and can be, for example, one or more of a cellular antenna such as an LTE antenna, a Wi-Fi antenna, a Bluetooth antenna, a GPS antenna, a multi-frequency antenna, and the like. The antenna(s) can be communicatively coupled to one or more additional components of the electronic device 500.

The main logic board 506 can determine an environment external to the housing 504 of the electronic device 500. The environment (i.e., a type of environment) can be determined to be an atmospheric or liquid environment. The determined environment can be aqueous, for example, when the user enters a body of water such as an ocean, lake, or pool and the electronic device 500 is submerged underwater. The main logic board 506 can determine the type of environment by any technology currently available or otherwise developed in the future. For example, the electronic device 500 can include one or more components which measure or detect characteristics of the environment based on location information (i.e., GPS data), pressure detection, spectroscopy, moisture detection, or a combination thereof.

In some examples, the electronic device 500 can include a speaker assembly 526 disposed within the housing 504. The speaker assembly 526 can include one or more speakers which convert electrical signals into acoustic waves that are audible at an environment external to the housing 504. For example, one or more apertures 530 can formed within the housing 504 which place the speaker assembly in fluid communication with the environment external to the housing 504. The internal components can be disposed within the internal volume defined at least partially by the housing 504, and can be affixed to the housing 504 via adhesives, internal surfaces, attachment features, threaded connectors, studs, posts, or other features, that are formed into, defined by, or otherwise part of the housing 504 and/or the back cover 534. As described herein, when the electronic device 500 is underwater, the water pressure on the speaker diaphragm may be too high for the speaker 526 to produce sound waves underwater. Instead, the display assembly 502 can be driven by the magnetic component 514 and coil 516 to generate sound waves underwater.

The electronic device 500 can include additional components such as one or more sensors capable of detecting physical features of the environment (e.g., temperature sensors, moisture sensors, accelerometers, gyroscopes, magnetometers, visual sensors, acoustic sensors, etc.). The sensors can be communicatively coupled to the main logic board 506 or another component having a processor within the electronic device 500. For example, one or more of the sensors can be coupled to the main logic board 506 through a wired communication path or a wireless communication path.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
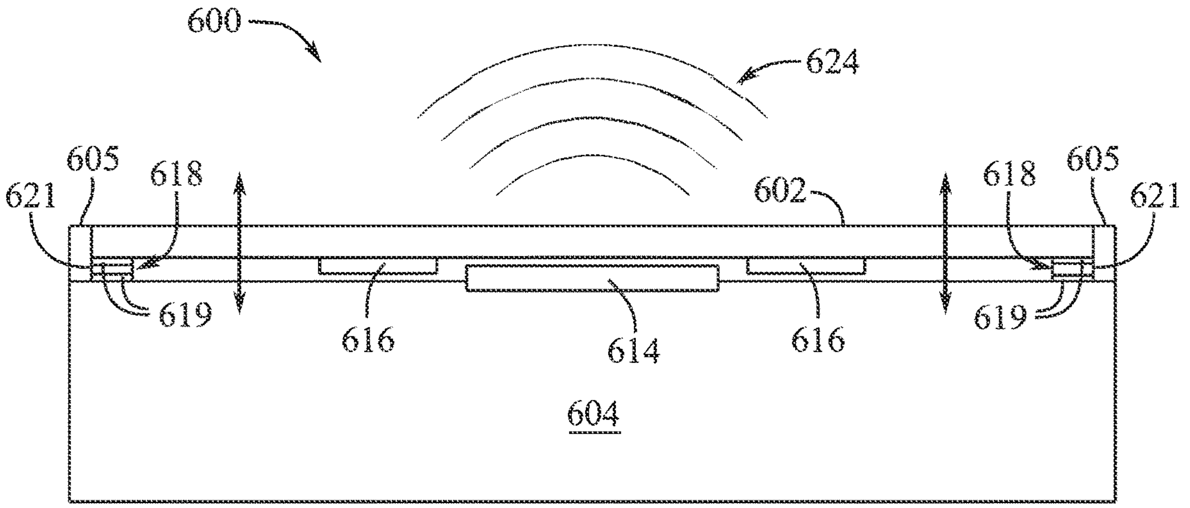
FIG. 6 shows a side cross-sectional view of an electronic device.

FIG. 6 shows a side cross-sectional view of an electronic device 600. The electronic device 600 can be substantially similar to, including some or all of the features of, the electronic devices described herein, such as electronic devices 100, 200, 300, 400, and 500. In some examples, the magnetic component 614 can be fixed relative to the housing 614. The magnetic component 614 can be rigidly mounted to a structural component of the housing 604 such as a sidewall or back wall. In some examples, the magnetic component 614 can be attached to a component disposed within the internal volume of the housing 604, such as one or more electrical components. The magnetic component 614 can be mounted to the housing 604 or a component within the housing 604 using a bracket, fasteners, adhesive, or any other suitable mounting mechanism.

The display 602 can include two major surfaces. A first major surface of the display 602 can be an external or exterior surface on which visual images are displayed and with which the user interacts with the electronic device 300 through touch. The second major surface of the display 602 can be an internal or interior surface that defines an underside of the display 602. The coil 616 can be attached to the underside of the display 602. The coil 616 can be fixed on in relation to the display 602. Thus, in response to an electromagnetic field of the coil 413 interacting with the magnetic component 614, the coil 616, and consequently, the display 602 move up and down, as indicated by the arrows and as oriented in FIG. 4. As the display moves back and forth, pressure waves or sound waves 624 can be created. The sound waves 624 can be specifically tuned and tailored to travel underwater and be audible by humans and/or detectable by acoustic sensors underwater.

The frequency range of the underwater sound waves produced by the moving display 602 can be in the audible or non-audible frequency range. In some examples, the display 602 can be tuned to produce waves having a frequency of about 100 kHz. In some examples, the frequency is less than 100 kHz. The frequency of waves produced by the moving display 602 underwater can be between about 50 kHz-100 KHz, between about 25 kHz-75 kHz, between about 15 kHz-30 kHz, or lower. In some examples, the frequency can be greater than 100 kHz. The frequency waves produced by the moving display 602 underwater can be between about 100 kHz-200 kHz, between about 200 kHz-500 kHz, between about 500 kHz-1 MHz. In some examples, the frequency can be specifically tailor to not be audible to humans but still be detectable by other electronic devices.

In some examples, the frequency of the sound waves produced by the display 602 can be based on the power or battery status of the device. For example, if the battery is low, the device can switch to a power saving mode in which frequencies are chosen which require less energy to produce.

The movement of the display 602 can be limited or restricted by the seal 618. In other words, the movement of the display 602 can be tuned using the seal 618. The seal 618 can include silicone 621 that is sandwiched between adhesive 619 used to adhere the silicone 621 to the underside of the display 602 and to the housing 604. The adhesive 619 can include a pressure sensitive adhesive (PSA). In some examples, the seal 618 can be positioned between the bezel 605 and the display 602.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
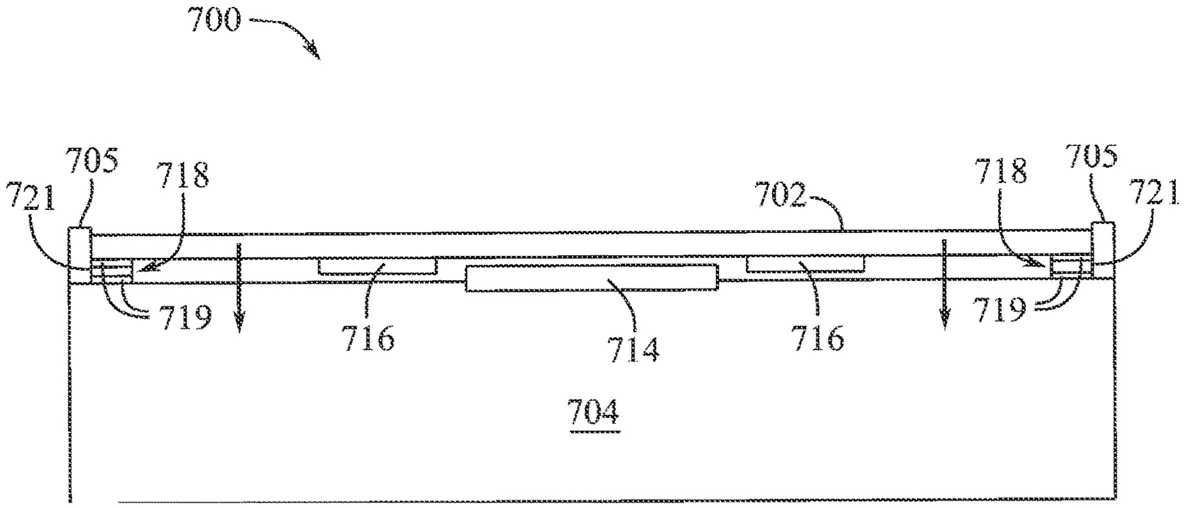
FIG. 7 shows a side cross-sectional view of an electronic device.

FIG. 7 shows a side cross-sectional view of an electronic device 700. The electronic device 700 can be substantially similar to, including some or all of the features of, the electronic devices described herein, such as electronic devices 100, 200, 300, 400, 500, and 600. For example, the electronic device 700 can include a housing 704, a bezel 705, a display 702, a magnetic component 714, a coil 716, and a seal 718. The display 702 can be flush with the bezel in some states, such as in a neutral or rest state when the magnetic component 714 and coil is not acting on the display 702. As illustrated, however, in a depressed state when the coil 716 and display 702 is being pulled down by the associated electromagnetic forces, the display 702 can be below the bezel 705. In other words, in the depressed state, the bezel 705 can be proud from the display 702, such that the display 702 appears sunken into the housing 704.

In some examples, the movement of the display 702 can be an additional input feature accessible by the user. For example, the user can press on the display 702 to produce a signal detectable by the processor. In some examples, a change in an electromagnetic field or capacitance cause by the depression of the display 702 can indicate that an input was made. Thus, the movable display can be used as a large button that can be pressed. This can be particularly convenient when wearing large gloves or when unable to provide precise inputs. The movement between the coil and the wire caused by the press on the screen can be detected and used to determine a certain input. In some examples, the vibration of the display 702 can act as a haptic feedback component that can be felt on the user's body. For example, in certain situations, a conventional haptic module may be limited (e.g., underwater). The vibration of the display 702 as described herein can not only produce sound waves, but can also act as a haptic component when its vibrations are felt by the user. In some examples, the vibrations created by the display 702 can be greater or more easily felt by the user.

In some examples, the display 702 can vibrate in order to disperse or shake off water located on the device 700. The display 702 can vibrate to shake off water in response to detected moisture on/in the device 700 or can be manually activated by the user. In some examples, the display 702 can translate or travel approximately 0.1 mm. For example, the display 702 can be compressed about 0.1 mm in a first direction (e.g., toward the internal volume of the enclosure). In some examples, the display 702 can extend or rise about 0.1 mm in a second direction, opposite the first direction (e.g., away from the internal volume of the enclosure). In some examples, the display 702 can move between about 0.025 mm-0.050 mm. In some examples, the display 702 can move between about 0.050 mm-0.075 mm. In some examples, the display 702 can move between about 0.075 mm-0.1 mm. In some examples, the display 702 can move between about 0.1 mm-0.150 mm. The distance the display 702 travels can be dependent of the desired sound wave to be produced.

As described above, the movement of the display 702 can be bound or otherwise tuned by the seal 718. The seal 718 can include a middle portion 721 (e.g., silicone) that is sandwiched between adhesives portions 719 that are used to secure the middle portion 721 of the seal 718 to the underside of the display 702 and to the housing 704. The adhesive portions 719 can include a pressure sensitive adhesive (PSA). In some examples, the seal 718 can include a first or top adhesive and a second or bottom adhesive. The adhesive portions 719 can each include a thickness of about 0.1 mm. In some examples, the adhesive portions 719 can each include a thickness of about 0.05 mm, about 0.08 mm, 0.13 mm, and/or 0.15 mm. In some examples, the middle portion 721 can have a thickness of about 0.8 mm, about 0.7 mm, about 1 mm, and/or about 1.2 mm. Thus, in some examples, the seal 718 can include a thickness of about 1 mm. In some examples, the seal 718, which can include the adhesive portions 719 and middle portion 721, can have a thickness of about 0.8 mm, about 1.2 mm, about 1.5 mm, or about 2 mm. In some examples, the seal 718 can include a width of greater than 1 mm. In some examples, the seal 718 includes a width of about 0.75 mm, about 0.9 mm, about 1.2 mm, about 1.5 mm, and/or about 2 mm.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
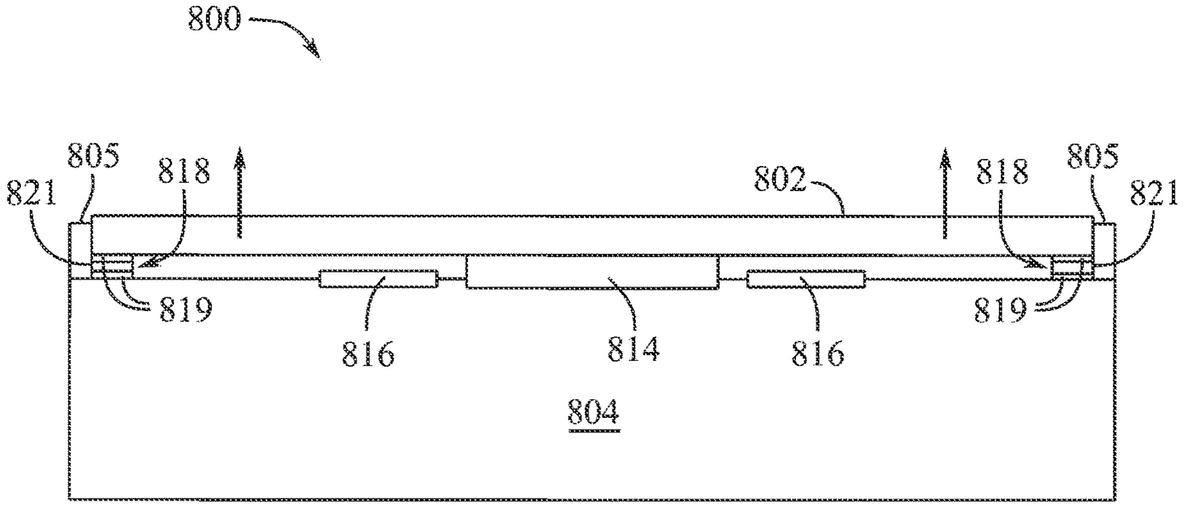
FIG. 8 shows a side cross-sectional view of an electronic device.

FIG. 8 shows a side cross-sectional view of an electronic device. The electronic device 800 can be substantially similar to, including some or all of the features of, the electronic devices described herein, such as electronic devices 100, 200, 300, 400, 500, 600, and 700.

The electronic device 800 can include a housing 804, a bezel 805, a display 802, a magnetic component 814, a coil 816, and a seal 818. The display 802 can be flush with the bezel in some states, such as in a neutral or rest state when the magnetic component 814 and coil is not acting on the display 802. As illustrated, however, in an extended state when the coil 816 and display 802 is being pushed up/out by the electromagnetic forces, the display 802 can extend above the bezel 805. In other words, in the extended state, the display 802 can be proud or protrude from the bezel 705.

As shown in FIG. 8, in some examples, the magnetic component 714 can be attached to the underside of the display 702 and the coil 716 can be fixedly mounted to the housing 704 or to a secure component fixed within the housing 704. The magnetic component 714 can be secured to the display 702 using any suitable securement means, including adhesive, fasteners, mounts, brackets, etc.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
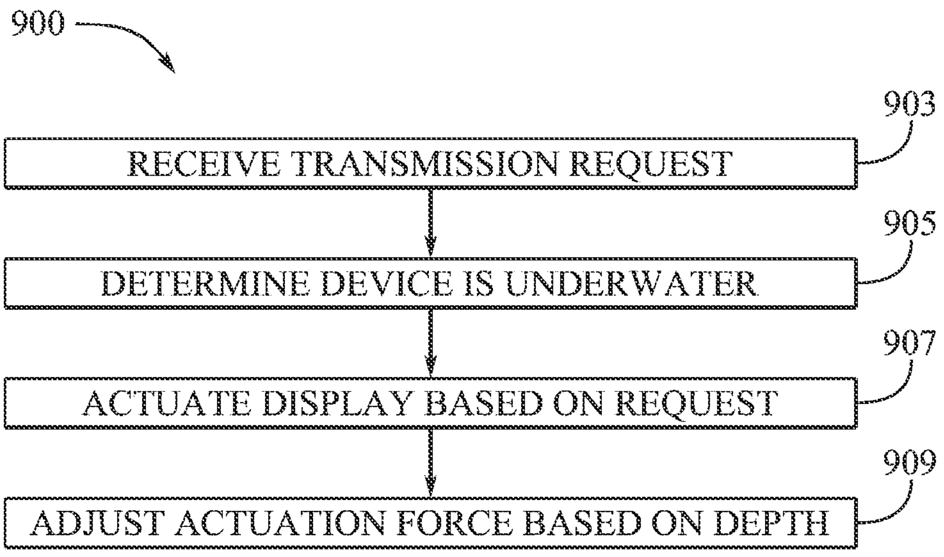
FIG. 9 shows a process flow diagram.

FIG. 9 includes a process 900 for producing sound waves underwater or in a high pressure environment. The process 900 can be implemented using one or more of the electronic devices described in any of the above example embodiments. At step 903, a transmission request can be received by a processor of the electronic device. The transmission request can include a request to produce an output or notification, such as a sound wave intended to notify the user or others. The transmission request can be generated in response to user input or in response to a signal produced by an electronic sensor of the electronic device (e.g., depth sensor, temperature sensor, Bluetooth, cellular sensor, biometric sensors, barometer, etc.)

At step 905, the device can determine whether it is underwater. The determination can be made using a number of methods, including pressure sensors, moisture sensors, GPS, temperature sensors, or being put in an underwater mode by the user. Importantly, upon determining that the device is underwater, it can be concluded that certain traditional notification methods, such as haptic or speaker module notification, may not be effective due to the device being underwater. Accordingly, the device can automatically or manually switch to providing the transmission request using the underwater notification method.

At step 907, the display is actuated based on the request. Actuation of the display can include moving, vibrating, or resonating the display in order to generate sound waves that are audible underwater. Actuation of the display can also include activating the display panel with visual notifications. The actuation can be modified depending on the notification. For example, certain noises, pitches, patterns, etc. can be used for different notifications. In some examples, the sound waves produced by the display can be heard as spoken language (e.g. reading a received message or status).

At step 909, the actuation force of the display can be adjusted or modulated based on a determined depth of the display. As explained above, the pressure experienced by a diaphragm, or in this case, a display, can impact its performance. Specifically, as the depth and pressure increase, more force is required to move the display and generate sound waves. Accordingly, the driver output can be based on a determined depth or pressure to ensure that the display is generating the intended waves at all times.

In some examples, a microphone can detect the sound waves and can verify their accuracy or can cause the processor to make any necessary changes. In some examples, the driver itself can be used to determine depth. For example, the resistance or impedance the display faces can be detected and used to determine a current depth of the electronic device. In some examples, the impedance or resistance the display experiences while vibrating can be used to detect water density, which can be used to infer depth and type of water (e.g., salt or fresh water).

Any of the steps, methods, or processes shown in FIG. 9 can be included, either alone or in any combination, in any of the other examples of devices, features, components, processes and parts shown in the other figures described herein. Likewise, any of the features, components, processes, and/or parts, including the arrangements and configurations thereof shown and described with reference to the other figures can be included, either alone or in any combination, in the example process shown in FIG. 9.

Figure 10:
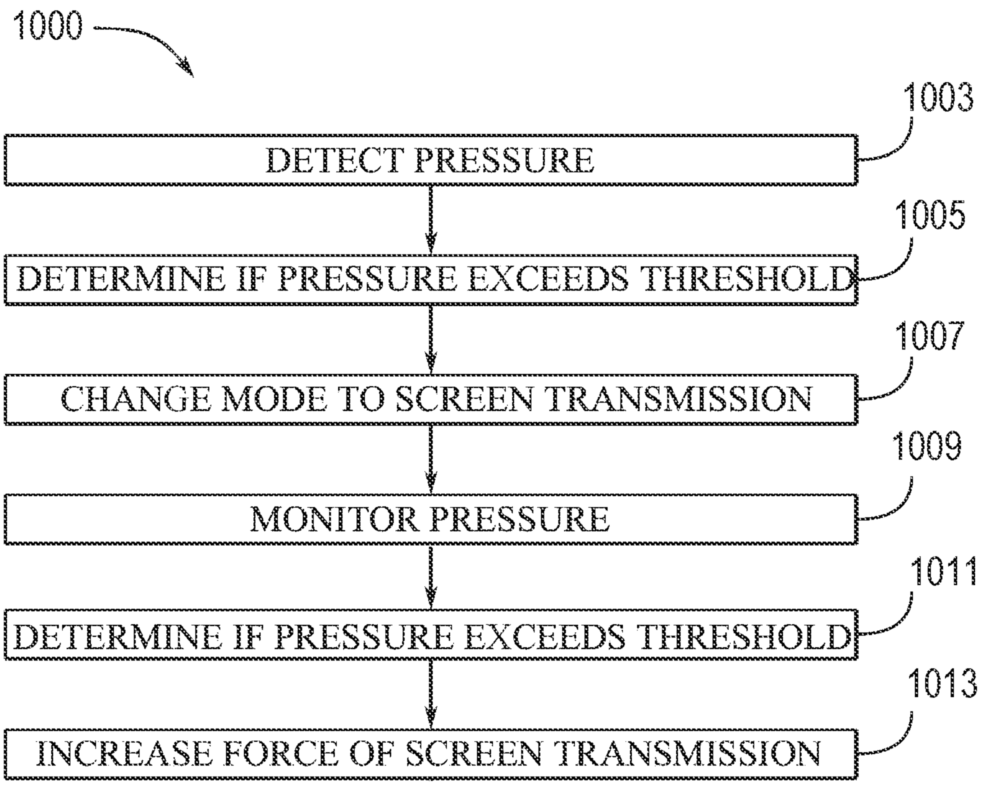
FIG. 10 shows a process flow diagram.

FIG. 10 includes a process 1000 for producing sound waves underwater or in a high pressure environment. The process 1000 can be implemented using one or more of the electronic devices described in any of the above example embodiments. At step 1003, a pressure can be detected. The electronic device can include one or more pressure sensors that are capable of determining characteristics of the device's environment, such as the atmospheric pressure or underwater pressure. Using the detected pressure, it can be determined whether the device is submerged underwater.

At step 1005, a processor can determine if the detected pressure exceeds a predetermined threshold. The predetermined threshold can correspond to an atmospheric pressure. In some examples, the predetermined threshold corresponds to an underwater pressure or hydrostatic pressure. For example, the pressure threshold can be between about 14.7-20 pounds per square inch, between about 20-30 pounds per square inch, or between about 30-50 pounds per square inch. The predetermined pressure threshold can be greater than 1 atmosphere (atm). In some examples, the predetermined pressure threshold can be between about 1.1-2 atm, between about 2-3 atm, or between about 4-5 atm.

Upon determining that the device is underwater, it can be concluded that certain traditional notification methods, such as haptic or speaker module notifications, may not be effective due to the device being underwater. At step 1007, the device can change modes to a screen transmission mode. The screen transmission mode can include moving the screen or display as described herein, to transmit notifications or signals via produced sound waves. Accordingly, the device can automatically or manually switch to the screen transmission mode.

The screen transmission mode can include actuating the display based on a received notification or request. Actuation of the display can include moving, vibrating, or resonating the display in order to generate sound waves that are audible underwater. Actuation of the display can also include activating the display panel with visual notifications. The actuation can be modified depending on the notification. For example, certain noises, pitches, patterns, etc. can be used for different notifications. In some examples, the sound waves produced by the display can be heard as spoken language (e.g. reading a received message or status).

At step 1009, the device can continue to monitor pressure while in the screen transmission mode. At step 1011, it can be determined whether the detected pressure exceeds a second threshold. The second threshold can be higher than the first. For example, the pressure threshold can be between about 14.7-20 pounds per square inch, between about 20-30 pounds per square inch, or between about 30-50 pounds per square inch. The predetermined pressure threshold can be greater than 1 atmosphere (atm). In some examples, the predetermined pressure threshold can be between about 1.1-2 atm, between about 2-3 atm, or between about 4-5 atm.

At step 1013, the force of the screen transmission can be increased. As the device travels deeper underwater, it may be necessary to adjust or compensate for the increased pressure to be able to produce the same sound waves as in lower pressure. Thus, the actuation force of the display can be adjusted or modulated based on a determined depth or pressure on the display. As explained above, the pressure experienced by a diaphragm, or in this case, a display, can impact its performance. Specifically, as the depth and pressure increase, more force is required to move the display and generate sound waves. Accordingly, the driver output can be based on a determined depth or pressure to ensure that the display is generating the intended waves at all times. Further, in some examples, the speed of sound at the particular depth and temperature of water can be calculated based on readings from a pressure sensor and/or a temperature sensor. Using a depth/pressure sensor or temperature sensor, the movement of the display, such as the force provided by the motor, can be adjusted to compensate for the underwater speed of sound, which varies based on the water depth and temperature. For example, a depth/pressure sensor or temperature sensor can provide a signal to the internal processor, and if the signal exceeds a predetermined threshold value, the movement of the display can be modified to produce more or less force to account for the detected depth and/or temperature of the water.

Any of the steps, methods, or processes shown in FIG. 10 can be included, either alone or in any combination, in any of the other examples of devices, features, components, processes and parts shown in the other figures described herein. Likewise, any of the features, components, processes, and/or parts, including the arrangements and configurations thereof shown and described with reference to the other figures can be included, either alone or in any combination, in the example process shown in FIG. 10. To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A wearable electronic device comprising:
- a housing defining an internal volume;
- a sensor configured to detect that the wearable electronic device is in a pressurized environment;
- a display movably connected to the housing; and
- an actuator disposed in the internal volume and connected to the display, the actuator configured to move the display based on the wearable electronic device being in the pressurized environment.

2. The wearable electronic device of claim 1, wherein:
- the wearable electronic device is a smartwatch;
- the display comprises a sapphire cover glass;
- the actuator comprises a magnetic component and a coil, the coil fixed to the display and movable relative to the magnetic component; and
- a deformable seal disposed along a perimeter of the display, the deformable seal connecting the display to the housing.

3. The wearable electronic device of claim 1, further comprising a seal disposed between a periphery of the display and the housing, the seal comprising an elastic material.

4. The wearable electronic device of claim 1, wherein the actuator comprises a metallic coil secured to an underside of the display, and a magnetic component fixedly secured to the housing.

5. The wearable electronic device of claim 1, wherein the display defines an exterior surface of the wearable electronic device, and the actuator produces uniform movement of the exterior surface.

6. The wearable electronic device of claim 1, wherein the actuator comprises at least one of a voice coil actuator, a moving magnetic component actuator, an eccentric rotating mass, or a linear resonant actuator.

7. The wearable electronic device of claim 1, wherein the movement of the display underwater is configured to generate sound waves between 50 Hz and 15,000 Hz.

8. The wearable electronic device of claim 7, further comprising a sensor to detect the sound waves.

9. The wearable electronic device of claim 1, wherein the actuator generates a variable force dependent on a detected pressure.

10. The wearable electronic device of claim 1, wherein the sensor configured to detect that the wearable electronic device is in a pressurized environment comprises a sensor configured to detect that the wearable electronic device is underwater.

* * * * *